United States Patent
Kai

(10) Patent No.: US 10,228,457 B2
(45) Date of Patent: Mar. 12, 2019

(54) RADAR DEVICE AND SENSOR FUSION SYSTEM USING THE SAME

(71) Applicant: Mitsubishi Electric Corporation, Tokyo (JP)

(72) Inventor: Koichi Kai, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 224 days.

(21) Appl. No.: 15/281,357

(22) Filed: Sep. 30, 2016

(65) Prior Publication Data

US 2017/0336504 A1 Nov. 23, 2017

(30) Foreign Application Priority Data

May 18, 2016 (JP) ................................. 2016-099303

(51) Int. Cl.
*G01S 7/41* (2006.01)
*G01S 13/86* (2006.01)
*G01S 13/93* (2006.01)

(52) U.S. Cl.
CPC .......... *G01S 13/867* (2013.01); *G01S 13/931* (2013.01); *G01S 7/41* (2013.01)

(58) Field of Classification Search
CPC . G01S 7/41; G01S 7/411; G01S 7/412; G01S 13/86; G01S 13/867; G01S 13/931
See application file for complete search history.

(56) References Cited

U.S. PATENT DOCUMENTS

| | | | | |
|---|---|---|---|---|
| 2004/0066285 A1* | 4/2004 | Sekiguchi | .......... | B60K 31/0008 340/435 |
| 2004/0246167 A1* | 12/2004 | Kumon | ..................... | G01S 7/41 342/70 |
| 2006/0140449 A1* | 6/2006 | Otsuka | ................. | G06K 9/3241 382/104 |
| 2008/0111733 A1 | 5/2008 | Spyropulos et al. | | |
| 2009/0135065 A1* | 5/2009 | Tsuchida | ............... | G01S 13/931 342/454 |
| 2010/0109938 A1* | 5/2010 | Oswald | ................. | G01S 7/2926 342/90 |
| 2010/0191391 A1* | 7/2010 | Zeng | ..................... | G01S 13/723 701/1 |
| 2010/0253594 A1* | 10/2010 | Szczerba | ............... | G01S 13/723 345/7 |
| 2010/0253597 A1* | 10/2010 | Seder | ....................... | B60R 1/00 345/7 |
| 2012/0140061 A1* | 6/2012 | Zeng | ..................... | G01S 13/726 348/135 |

(Continued)

FOREIGN PATENT DOCUMENTS

| | | |
|---|---|---|
| JP | 2004-117071 A | 4/2004 |
| JP | 4665948 B2 | 4/2011 |
| JP | 5543061 B2 | 7/2014 |

*Primary Examiner* — Peter M Bythrow
(74) *Attorney, Agent, or Firm* — Sughrue Mion, PLLC; Richard C. Turner

(57) ABSTRACT

In order to improve accuracy of kind identification of a detected object in a radar device provided in a sensor fusion system, information of the result of kind identification by a camera device provided in the sensor fusion system is given to the radar device and an attribution degree database that is used for identification determination by the radar device during the operation of the sensor fusion system is updated by a database update block.

8 Claims, 5 Drawing Sheets

(56) References Cited

U.S. PATENT DOCUMENTS

| | | | | |
|---|---|---|---|---|
| 2013/0002470 A1* | 1/2013 | Kambe | ................ | G01S 13/867 342/55 |
| 2015/0112570 A1* | 4/2015 | Schmudderich | ...... | B60W 50/14 701/93 |
| 2016/0103213 A1* | 4/2016 | Ikram | .................... | G01S 13/42 342/105 |
| 2016/0109566 A1* | 4/2016 | Liu | ........................ | G01S 13/66 342/52 |
| 2016/0236682 A1* | 8/2016 | Takada | ................. | B60W 30/09 |

* cited by examiner

RADAR DEVICE AND SENSOR FUSION SYSTEM USING THE SAME

BACKGROUND OF THE INVENTION

1. Field of the Invention

The present invention relates to a radar device and a sensor fusion system that uses the radar device as one of sensors.

2. Description of the Related Art

Formerly, in order to detect an object around one's own vehicle shown in Patent Document 1, there exists a sensor fusion system that uses two sensors of a radar device and a camera device. The sensor fusion system is used for a collision damage mitigation braking system that reduces collision damage at the time when one's own vehicle collides with an anterior obstacle, and an adaptive cruise control system that follows an anterior vehicle.

Generally, in a vehicle-mounted radar device, distance accuracy and relative speed accuracy are high; however, angle accuracy is low and identification function that identifies a kind of an object is not provided or accuracy of the identification function is low. Whereas, in a camera device, distance accuracy and relative accuracy are relatively low; however, angle accuracy and identification accuracy are good. The sensor fusion system using the radar device and the camera device is intended to improve the distance accuracy, the relative speed accuracy, the angle accuracy, and the identification accuracy by discriminating the same objects from the detection result of each sensor device and by using a value having higher accuracy in the respective sensor devices and to improve reliability of the detection result by the use of a plurality of the sensor devices.

In Patent Document 2, the height of an object is estimated and a determination is made as to whether the object is an object to be controlled or an object capable of being overstepped by checking an amplitude pattern dictionary (database) preliminarily created by the use of various sorts of objects whose heights are known.

As a different example, in Patent Document 3, identification is made as to whether or not a subject is a vehicle or a person to determine as to whether or not the subject is a braking subject on the basis of received power (radar reflection sectional area) and a variation (standard deviation) of the difference between received power in an ascending section and a descending section of frequencies in a frequency modulated continuous wave (FMCW) system.

[Patent Document 1] JP2004-117071A
[Patent Document 2] JP5543061B
[Patent Document 3] JP4665948B Since the known radar devices are configured as described above, a problem exists in that a determination is performed on the basis of only a feature quantity derived from signal strength in Patent Document 1 and accordingly estimation accuracy deteriorates when the measurement result cannot be normally obtained.

Furthermore, in a system of checking the dictionary as shown in Patent Document 2, a problem exists in that a large number of data needs to be obtained for creating the dictionary which is for performing a highly accurate estimation, a high calculation load and a large capacity of memory are generally further required for checking, and accordingly costs are increased.

Moreover, in a method of Patent Document 3, a braking subject/non-braking subject can be narrowed down by preliminarily identifying an object and thus an improvement in the final determination accuracy can be expected. However, radar reflection sectional area is changed by a beam pattern, an object's material, a posture, and a distance and accordingly it is conceivable that a stable determination is difficult. Additionally, a certain level of data accumulation is required for calculating variations and accordingly it may have the potential to delay handling for a temporally tight situation, for example, a sudden lane change of an anterior vehicle.

SUMMARY OF THE INVENTION

The present invention has been made to solve the foregoing problems, and an object of the present invention is to provide a radar device with higher identification accuracy and a sensor fusion system with higher accuracy.

According to the present invention, there is provided a radar device serving as a sensor device having an identification device that identifies a kind of a detected object by using a preliminarily created database. The radar device includes a database update block that updates the database on the basis of the result of the identification device and the result of an object kind identification device, which is obtained by a different sensor device.

The radar device according to the present invention can improve identification performance by updating the database on the basis of the calculation result of attribution degree and the identification result of object kind, which is obtained by the different sensor device.

The foregoing and other object, features, aspects, and advantages of the present invention will become more apparent from the following detailed description of the present invention when taken in conjunction with the accompanying drawings.

DETAILED DESCRIPTION OF THE INVENTION

Embodiment 1

First, the present applicant investigates the aforementioned problems to obtain a radar device capable of identifying an object by using features of the object extracted from measurement values of a radar device.

The radar device such as this includes: a first feature quantity extraction block that extracts information related to at least a relative distance and a relative speed to the object and an angle and the reflection strength of the object about a plurality of objects, as a first feature quantity at a constant time cycle from a reception signal of the radar device; a data storage processing block which stores the first feature quantity and associates a plurality of the first feature quantities with the same object in temporal sequence over a plurality of cycles; a second feature quantity extraction block that extracts a second feature quantity such as a maximum value (maximum detection distance) of the relative distance, a received power value, a change quantity of the received power value from the first feature quantity in the data storage processing block; an attribution degree calculation block that calculates an attribution degree to the distribution of the second feature quantity related to a preliminarily defined category; and an object determination block that determines the category of the object on the basis of the attribution degree.

Incidentally, the attribution degree calculation block calculates a value for each category of each feature quantity of the second feature quantity (attribution degree) which is inputted from the second feature quantity extraction block on the basis of the distribution of attribution degree for each second feature quantity obtained from an attribution degree database. More specifically, the attribution degree to the distribution of the second feature quantity related to the preliminarily defined category is calculated.

Figure 6:
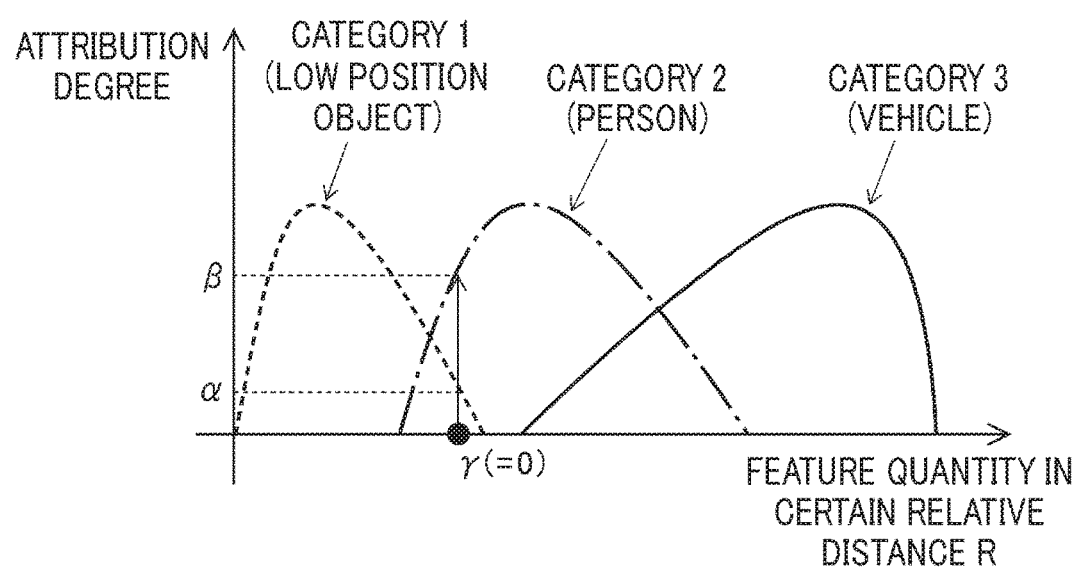
FIG. 6 is an explanation view showing a relationship of attribution degrees of respective categories (kinds) to a certain feature quantity.

For example, when the distribution of attribution degree showing the relationship between a feature quantity and an attribution degree in a certain distance is registered in the attribution degree database as shown in FIG. 6, and when the second feature quantity about a certain object detected by the radar is calculated as a value shown by a black point, the attribution degree of a category 1 is a small value ($=\alpha$), the attribution degree of a category 2 is a large value ($=\beta$), and the attribution degree of a category 3 is 0 ($=\gamma$).

Furthermore, the attribution degree database quantifies and stores: the distribution of the second feature quantity obtained by preliminarily observing several examples about the preliminarily defined categories; the distribution of the second feature quantity based on theoretical values derived from transmission power, distance, antenna gain, reflection sectional area, and the like; and properties based on experimental knowledge related to the categories.

For example, acquisition of the distribution of the attribution degree of FIG. 6 can be made by standardizing a maximum value after creating a histogram of a sample (teacher data).

The object determination block identifies which category the object belongs on the basis of the attribution degree for each category related to the object inputted from the attribution degree calculation block, more specifically, identifies a kind of the object (for example, vehicle, person, low position object capable of being overridden, and the like), and outputs the result of the identification.

The aforementioned radar device sets a change quantity in a short time of the reflection strength of the object obtained by the radar device as the feature quantity and identifies the category (kind) of the object; and therefore, highly accurate object identification can be achieved in a short time or from a small number of measurement points.

Furthermore, the radar device identifies the category (kind) of the objects on the basis of a plurality of feature quantities of the object obtained by the radar device; and therefore, highly accurate object identification can be achieved even when there exists a deficit or the like.

By the way, the aforementioned radar device creates the attribution degree database in which the feature quantities of the known objects are preliminarily made into a database; however, for example, when there is an individual difference in transmission power of a radio wave of the radar device and in the case of an individual that is low in transmission power, the received power value is decreased. When the feature quantity depending on the received power value is used, there arises a difference from the feature quantity stored in the database and accordingly an erroneous determination is likely to be made. For example, the radar device identifies a certain object as a person and the camera device identifies the same object as a vehicle; and accordingly, the detected object by the radar device and the detected object by the camera device are likely to be determined as different objects in sensor fusion processing.

Furthermore, in the case of creating the attribution degree database in the aforementioned radar device, it is conceivable that a robust object can be identified with an increase in source data; however, much time and cost are likely to be required for data accumulation.

Figure 1:
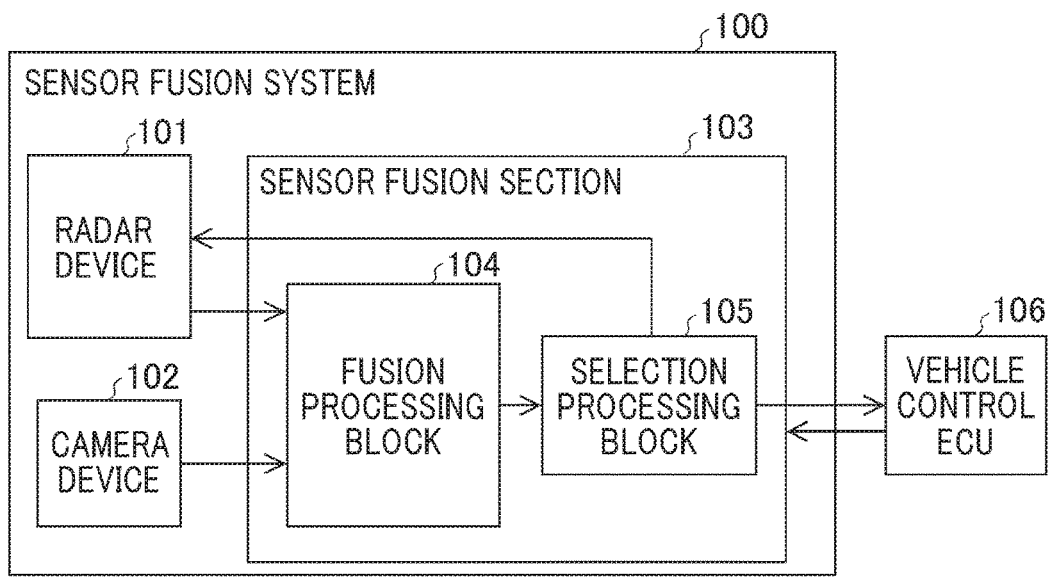
FIG. 1 is a block diagram showing a sensor fusion system of Embodiment 1 of the present invention.
Figure 2:
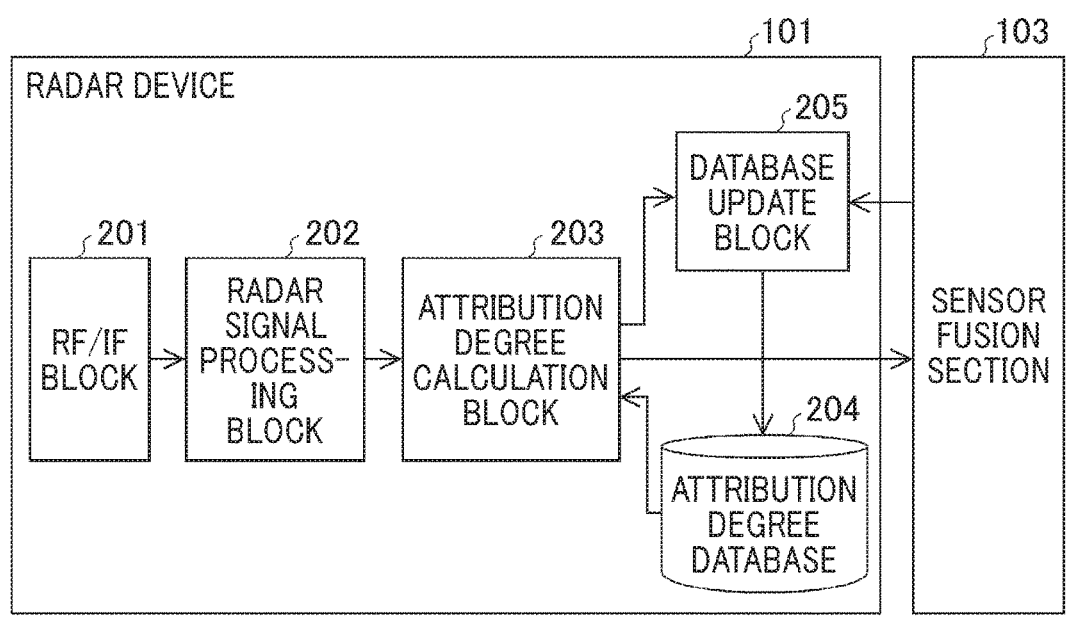
FIG. 2 is a block diagram showing a radar device provided in the sensor fusion system according to Embodiment 1 of the present invention.

Next, Embodiment 1 of the present invention that solves the problems in the radar device such as this will be described on the basis of drawings. FIG. 1 and FIG. 2 show the configuration of a sensor fusion system and the radar device that is a major portion thereof in Embodiment 1 of the present invention. Incidentally, the same reference numerals as those shown in the respective drawings represent identical or corresponding elements.

As shown in FIG. 1, a sensor fusion system 100 includes: a radar device 101 serving as a sensor device having an identification device that identifies a kind of a detected object; a camera device 102 serving as a different sensor device having an object kind identification device that can obtain the identification result of object kind; a sensor fusion section 103; a fusion processing block 104; and a selection processing block 105. The sensor fusion system 100 is used for controlling a vehicle control engine control unit (ECU) 106.

The sensor fusion section 103 performs fusion processing of the detection result of the radar device 101 and the detection result of the camera device 102. The fusion processing block 104 determines as to whether or not the detection result of the radar device 101 and the detection result of the camera device 102 are the same and performs tracking processing in the sensor fusion section 103. The selection processing block 105 selects control data necessary for vehicle control and data necessary for database update of the radar device 101 from the result of fusion outputted by the fusion processing block 104. The vehicle control ECU 106 performs vehicle control which is automatic braking and/or adaptive cruise control (ACC) from information obtained by the sensor fusion system 100.

Next, the radar device 101 that is the major portion of the present invention will be described in detail on the basis of FIG. 2. As shown in the same drawing, the radar device 101 includes: a radio frequency/intermediate frequency (RF/IF) block 201; a radar signal processing block 202; an attribution degree calculation block 203 serving as an identification device; an attribution degree database 204; and a database update block 205. The radar device 101 performs sending/receiving of a signal to/from the sensor fusion section 103. Incidentally, the sensor fusion section 103 is configured similarly to those shown in FIG. 1.

The RF/IF block 201 transmits/receives a signal wave and generates a base band signal from a transmission wave and a reception wave. The radar signal processing block 202 performs analog/digital (A/D) conversion of the base band signal sent from the RF/IF block 201 and calculates a distance, a relative speed, and an angle of an object from the A/D conversion signal. The attribution degree calculation block 203 calculates an attribution degree for each category of each detected object from the detection result of the radar signal processing block 202 and the attribution degree database 204 and outputs a final identification result. The attribution degree database 204 is an attribution degree database that is intended to be referred by the attribution degree calculation block 203. The database update block 205 updates the attribution degree database 204 on the basis of the result of the attribution degree calculation block 203 and an identification result by the camera device, the identification result being an output from the sensor fusion section 103.

In the thus configured radar device, a database suitable for a practical use environment is generated by updating the attribution degree database 204 by the database update block 205 during running.

Figure 3:
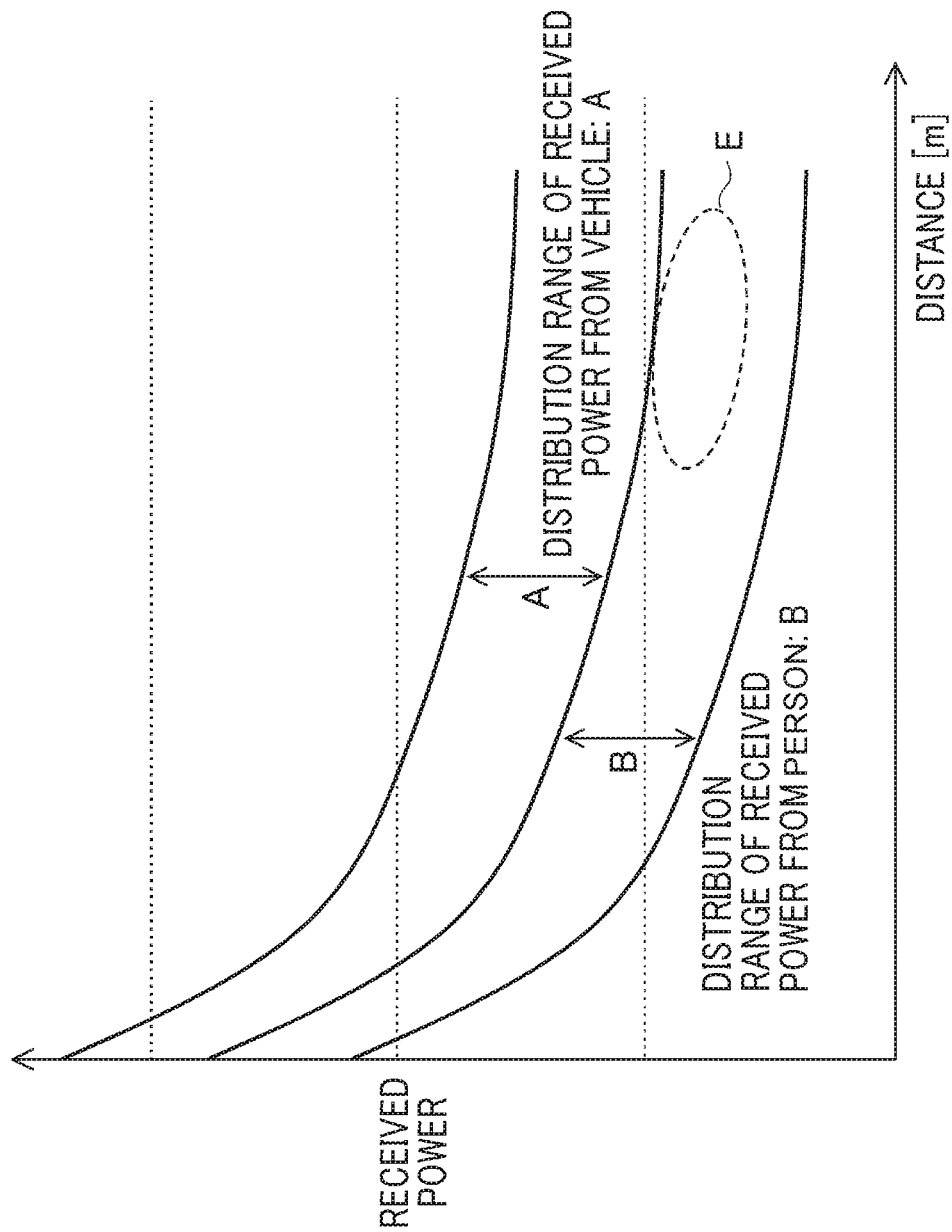
FIG. 3 is an explanation view showing the relationship between distance and received power at the time when a vehicle and/or a person is detected by an individual of standard transmission power, in the radar device provided in the sensor fusion system according to Embodiment 1 of the present invention.

As the specific operation of the database update block 205, description will be made on a case where attribution degrees of a vehicle and a person are calculated from received power. FIG. 3 is a view showing the relationship between a distance and a received power value when a vehicle and a person are detected by an individual that is standard in transmission power of the RF/IF block 201 in the radar device 101. If the relationship between the distance and the received power of the object detected by the radar device is within a distribution range of received power from the vehicle: A, the attribution degree of the vehicle becomes high; and if the relationship is within a distribution range of received power from the person: B, the attribution degree of the person becomes high.

Figure 4:
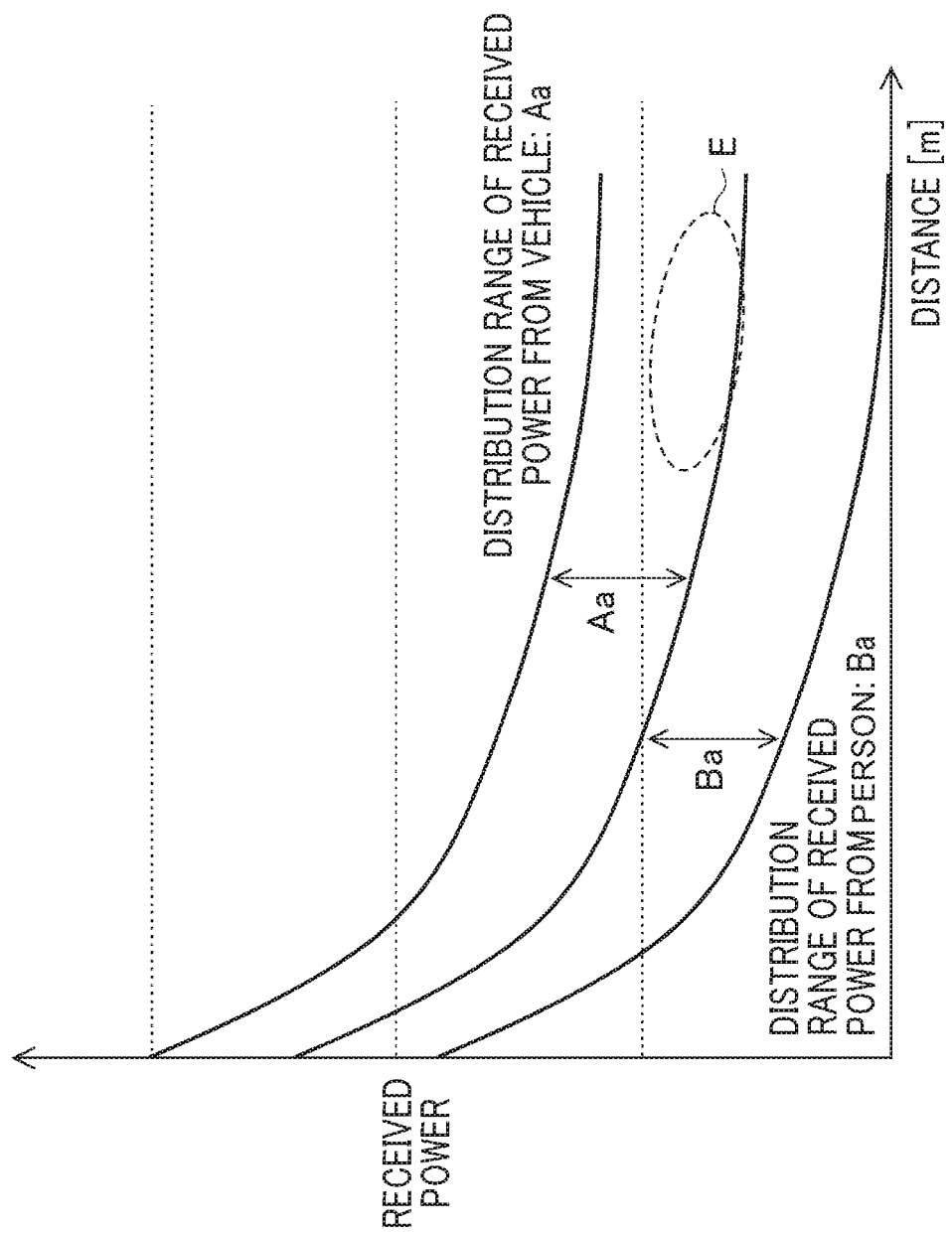
FIG. 4 is an explanation view showing the relationship between distance and received power at the time when a vehicle and/or a person is detected by an individual that is smaller in transmission power than the standard individual, in the radar device provided in the sensor fusion system according to Embodiment 1 of the present invention.

Whereas, FIG. 4 is a view showing the relationship between a distance and a received power value in the case of detecting a vehicle and a pedestrian by an individual that is small in transmission power. If reception performance is almost the same as the standard individual, the received power becomes small since the transmission power is small. More specifically, as shown in FIG. 4, as for the distribution of the received power, both of a distribution range of received power from the vehicle: Aa and a distribution range of received power from the person: Ba are positioned in a lower direction (in a direction reducing the received power).

Here, when the radar device 101 detects an object showing a value of a range shown by a dotted line E in FIG. 3 and FIG. 4, the object is likely to be identified as the person in the case of being detected by the standard individual, but the object is likely to be identified as the vehicle in the case of being detected by the individual that is small in transmission power; and accordingly, it results in erroneous identification. However, when the identification result of the camera device 102 is determined as the person, the attribution degree can be correctly obtained by shifting the relationship between the distance and the received power as shown in FIG. 5.

Figure 5:
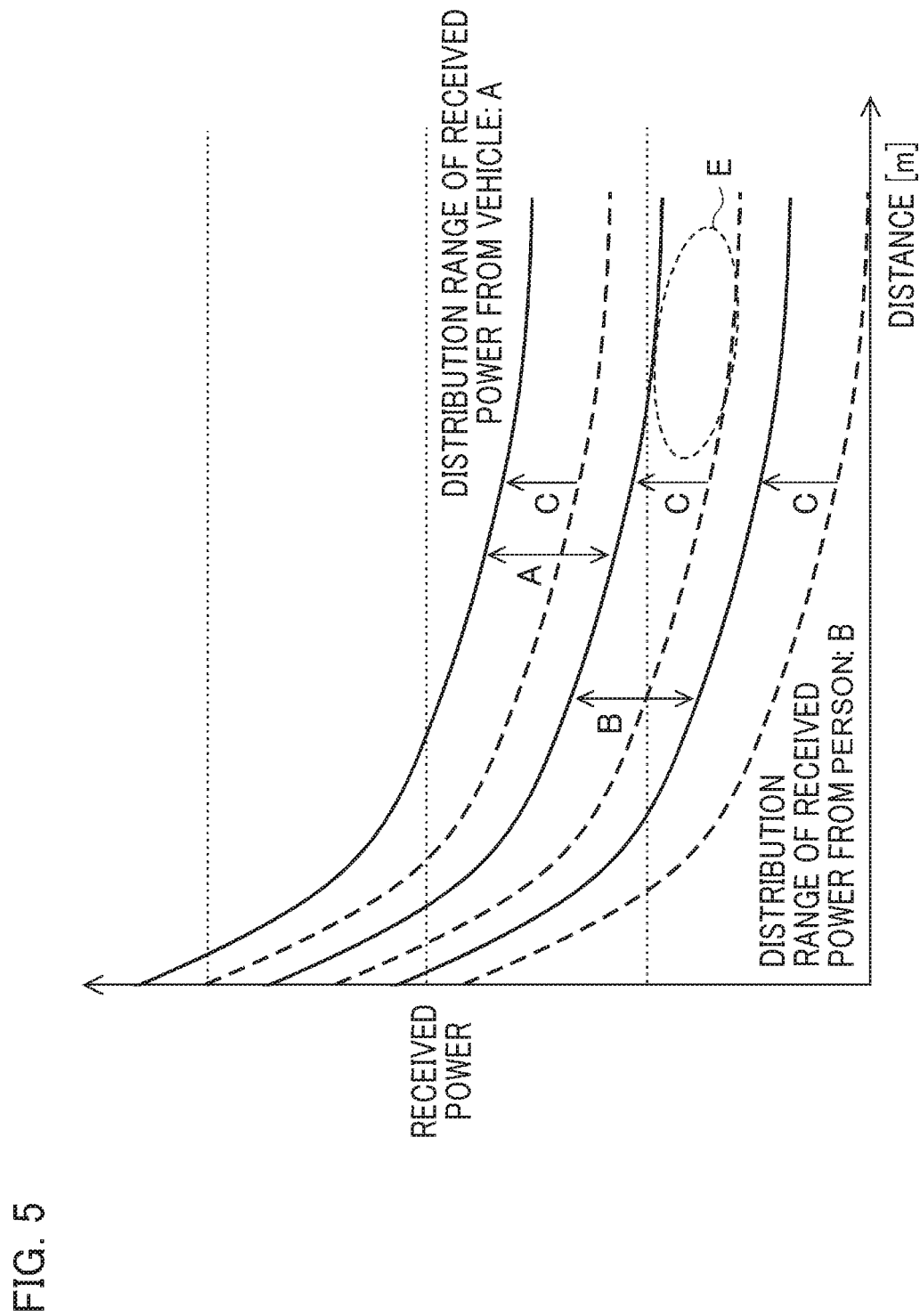
FIG. 5 is an explanation view showing results in which the relationship between the distance and the received power at the time when the vehicle and/or the person is detected by the individual that is smaller in transmission power than the standard individual, is made to shift in response to the identification result of a camera device, in the radar device provided in the sensor fusion system according to Embodiment 1 of the present invention.

More specifically, in FIG. 5, it becomes characteristics like a solid line curve by shifting characteristics shown by a dotted line curve upward as shown by an arrow "C"; and both of the distribution range of received power from the vehicle: A and the distribution range of received power from the person: B become the characteristics of FIG. 3.

As described above, in the present invention, even when the database prepared in manufacturing has variations in performance of the radar device, information in which the camera device identifies as the person from the result of sensor fusion is inputted to the radar device. Then, from the result thereof, it is recognized that the distribution of received power of the person is lower than that of the standard individual, it becomes possible to reflect to the database, identification performance of the object by the radar device can be improved, and it becomes possible to improve determination performance of the same object of the sensor fusion system. Furthermore, the radar device suitable for the sensor fusion system can be obtained.

Furthermore, the sensor fusion system using the radar device and the camera device is provided in Embodiment; however, a sensor fusion system which uses a sensor device with high identification accuracy other than the camera device and a radar device can also be provided.

The present invention is not limited to the above example, but the embodiment can be appropriately changed in the scope of the present invention.

What is claimed is:

1. A sensor fusion system for a vehicle, the sensor fusion system comprising:
   a radar device configured to receive a signal wave reflected from a target object, and identify a type of the target object based on a measured reception power of the signal wave by using a preliminarily created database that stores, for a plurality of different object types, a relationship between a distance to a reference object and a reception power of a reference signal wave that is reflected from the reference object;
   a camera device configured to identify the type of the target object; and
   a sensor fusion section configured to determine whether the type of the target object identified by the radar device is equal to the type of the object identified by the camera device,
   wherein the radar device comprises a database update block that updates the database when the type of the object identified by the radar device is different from the type of the object identified by the camera device.

2. The sensor fusion system according to claim 1, wherein the radar device comprises:
   a radar signal processor that calculates a distance, a relative speed, and an angle of the target object by performing signal processing based on a transmission wave and a reception wave;
   an attribution degree database serving as the database in which a feature quantity of the reference object is made into data to be stored; and
   an attribution degree calculator that calculates an attribution degree to a distribution of the feature quantity related to the reference object based on a detection result of the radar signal processor and the attribution degree database and outputs an identification result based on the calculated attribution degree,
   wherein the database update block updates the attribution degree database based on the identification result of the attribution degree calculator and another identification result outputted from the camera device to indicate the type of the target object.

3. The sensor fusion system according to claim 1, wherein the database stores the relationship between the distance and the reception power as a graph, and the database update block updates the database by shifting up the graph to increase a value of the reception power corresponding to the same distance in the graph when a transmission power of the signal wave is lower than a standard transmission power.

4. The sensor fusion system according to claim 2, wherein the database stores the relationship between the distance and the reception power as a graph, and the database update block updates the database by shifting up the graph to increase a value of the reception power corresponding to the same distance in the graph when a transmission power of the signal wave is lower than a standard transmission power.

5. The sensor fusion system according to claim 1, wherein:
   the radar device outputs, as a first detection result, the type of the target object identified by the radar device;
   the camera device outputs, as a second detection result, the type of the target object identified by the camera device; and
   the sensor fusion section performs fusion processing on the first detection result and the second detection result to track the target object.

6. The sensor fusion system according to claim 2, wherein:
   the radar device outputs, as a first detection result, the type of the target object identified by the radar device;
   the camera device outputs, as a second detection result, the type of the target object identified by the camera device; and
   the sensor fusion section performs fusion processing on the first detection result and the second detection result to track the target object.

7. The sensor fusion system according to claim 5, wherein the sensor fusion section includes:
   a fusion processor which determines as to whether or not the first detection result is equal to the second detection result and performs tracking processing; and
   a selection processor that selects first data for controlling the vehicle and second data for updating the database from a result of the fusion processing.

8. The sensor fusion system according to claim 6, wherein the sensor fusion section includes:
   a fusion processor which determines as to whether or not the first detection result is equal to the second detection result and performs tracking processing; and
   a selection processor that selects first data for controlling the vehicle and second data for updating the database from a result of the fusion processing.

* * * * *